United States Patent
Ashtiani et al.

(10) Patent No.: US 10,929,414 B2
(45) Date of Patent: *Feb. 23, 2021

(54) FLEXIBLE INTERACTIVE DATA VISUALIZATION ENABLED BY DYNAMIC ATTRIBUTES

(71) Applicant: INTERNATIONAL BUSINESS MACHINES CORPORATION, Armonk, NY (US)

(72) Inventors: Behrooz Ashtiani, Thornhill (CA); Mitra Khatibi, Richmond Hill (CA); Diana Lau, Richmond Hill (CA); Jin Li, Markham (CA); Joanna W. Ng, Unionville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/002,729

(22) Filed: Jun. 7, 2018

(65) Prior Publication Data

US 2018/0285431 A1    Oct. 4, 2018

Related U.S. Application Data

(63) Continuation of application No. 15/209,576, filed on Jul. 13, 2016, now Pat. No. 10,067,992.

(51) Int. Cl.
*G06F 16/248* (2019.01)
*G06F 3/0482* (2013.01)
(Continued)

(52) U.S. Cl.
CPC .......... *G06F 16/248* (2019.01); *G06F 3/0482* (2013.01); *G06F 3/04847* (2013.01); *G06F 16/2428* (2019.01); *G06F 40/12* (2020.01)

(58) Field of Classification Search
CPC .. G06F 16/248; G06F 16/2428; G06F 3/0482; G06F 3/04847; G06F 40/12
(Continued)

(56) References Cited

U.S. PATENT DOCUMENTS 6,995,768 B2    2/2006   Jou et al.
7,265,755 B2    9/2007   Peterson
(Continued)

OTHER PUBLICATIONS

Brunetti, Josep Maria, et al., "Formal Linked Data Visualization Model", iiWAS2013, Vienna, Austria, Dec. 2-4, 2013, 10 pages.*
(Continued)

*Primary Examiner* — Robert Stevens
(74) *Attorney, Agent, or Firm* — Tutunjian & Bitetto, P.C.; Scott Dobson

(57) ABSTRACT

A method and system are provided for interactive data visualization. The method includes dynamically determining, responsive to a user request directed to at least one of default categories identified by analyzing a data source used with an initial user query, pre-set values for categorical portions and numerical portions of vocabularies for user selection using data analytics on the data source. The method also includes providing the user with a capability to specify other values for the portions. The method additionally includes dynamically generating multiple sub-queries to the data source for the pre-set values and at least one of the other values specified by the user for the portions. The method further includes generating a data visualization of combined result sets for the multiple sub-queries and displaying the data visualization.

20 Claims, 19 Drawing Sheets

(51) Int. Cl.
*G06F 3/0484* (2013.01)
*G06F 16/242* (2019.01)
*G06F 40/12* (2020.01)

(58) Field of Classification Search
USPC .......................................................... 707/722
See application file for complete search history.

(56) References Cited

U.S. PATENT DOCUMENTS

| | | | |
|---|---|---|---|
| 7,557,805 B2 | 7/2009 | Wong et al. | |
| 8,020,110 B2 * | 9/2011 | Hurst | G06F 16/3323 |
| | | | 715/765 |
| 8,423,567 B1 | 4/2013 | Finneran et al. | |
| 8,640,056 B2 | 1/2014 | Helfman et al. | |
| 8,645,853 B2 | 2/2014 | Prinsen et al. | |
| 2013/0332481 A1 * | 12/2013 | Lau | G06F 16/2457 |
| | | | 707/769 |
| 2014/0164964 A1 | 6/2014 | Cannon et al. | |
| 2017/0132296 A1 * | 5/2017 | Ding | G06F 16/248 |
| 2018/0144065 A1 * | 5/2018 | Yellai | G06F 16/248 |

OTHER PUBLICATIONS

Mitri, Michel, "Mapping Queries to Visualizations: Advanced Database Topics and Practice for Business Intelligence Students", AMCIS 2012, Seattle WA, Aug. 9-12, 2012, 12 pages.*
"The Crowd Has Spoken", TIBCO Spotfire, Last accessed on Jul. 13, 2016, 3 pages, http://spotfire.tibco.com/.
AVS, "Data Visualization API, Software, Tool—OpenViz", Last accessed on Apr. 5, 2016, 4 pages, http://www.avs.com/solutions/openviz/.
SAS, "The Power to Know", Last accessed on Jul. 13, 2016, 5 pages, http://www.sas.com/en_us/software/business-intelligence/visual-analytics/demo.html.
Tableau, "Business Intelligence and Analytics", Last Accessed on Jul. 13, 2016, 7 pages, https://www.tableau.com/.
List of IBM Patents or Patent Applications Treated as Related dated Jun. 7, 2018, 2 pages.

* cited by examiner

FLEXIBLE INTERACTIVE DATA VISUALIZATION ENABLED BY DYNAMIC ATTRIBUTES

BACKGROUND

Technical Field

The present invention relates generally to information processing and, in particular, to flexible interactive data visualization enabled by dynamic attributes.

Description of the Related Art

Today's data visualization enables end users to (a) explore their data; (b) view the corresponding returned result set in graphical forms such as pie charts and histograms. End users typically explore their data by interacting (using interactions such as drill down, trace up and combine) with the visualized graph of the returned result set. However, programmers of the data visualization have total control of what and how end users could interact with their data. If programmers did not anticipate or include certain data attributes or views, end users would not be able to interact with the visualized graph the way they need. End users must ask the programmers to re-program the data visualization to meet their needs, and would normally wait many months for the revised capability. End users are thus reliant on data visualization programmers in the aforementioned scenarios.

The common user interactions with visualized graph are: (i) drill down, which involves narrowing down from a current visualization view; (ii) trace up, which expands the data scope from an initial data visualization from an original data source; and (iii) combine, where existing categories are grouped into larger groups with less categories. However, the latest technologies available today do not support all of these common user interactions. The existing solutions have some severe restrictions. For example, one severe restriction is that current user interactions with data visualization are rigid, fixed, preset, and controlled entirely by programmers. Another severe restriction is that no current solution exists that supports dynamic queries out of the data context of original data visualization previously shown.

Thus, there is a need for flexible interactive data visualization enabled by dynamic attributes.

SUMMARY

According to an aspect of the present principles, a method is provided for interactive data visualization. The method includes dynamically determining, by a hardware processor responsive to a user request directed to at least one of default categories identified by analyzing a data source with an initial user query, pre-set values for categorical portions and numerical portions of vocabularies for user selection using data analytics on the data source. The method also includes providing, by a user interface, the user with a capability to specify other values for the categorical portions and the numerical portions of the vocabularies. The method additionally includes dynamically generating, by the hardware processor, multiple sub-queries to the data source for the pre-set values and at least one of the other values specified by the user for the categorical portions and numerical portions of the vocabularies The method also includes generating, by the hardware processor, a data visualization of combined result sets for the multiple sub-queries and displaying the data visualization on a display device.

According to another aspect of the present principles, a computer program product is provided for interactive data visualization. The computer program product includes a non-transitory computer readable storage medium having program instructions embodied therewith. The program instructions are executable by a computer to cause the computer to perform a method. The method includes dynamically determining, by a hardware processor responsive to a user request directed to at least one of default categories identified by analyzing a data source used with an initial user query, pre-set values for categorical portions and numerical portions of vocabularies for user selection using data analytics on the data source. The method also includes providing, by a user interface, the user with a capability to specify other values for the categorical portions and the numerical portions of the vocabularies. The method additionally includes dynamically generating, by the hardware processor, multiple sub-queries to the data source for the pre-set values and at least one of the other values specified by the user for the categorical portions and numerical portions of the vocabularies. The method further includes generating, by the hardware processor, a data visualization of combined result sets for the multiple sub-queries and displaying the data visualization on a display device.

According to yet another aspect of the present principles, a system is provided for interactive data visualization. The system includes a hardware processor, configured to dynamically determine, responsive to a user request directed to at least one of default categories identified by analyzing a data source with an initial user query, pre-set values for categorical portions and numerical portions of vocabularies for user selection using data analytics on the data source. The hardware processor is also configured to dynamically generate multiple sub-queries to the data source for the pre-set values and at least one of other values specified by the user for the categorical portions and numerical portions of the vocabularies. The hardware processor is further configured to generate a data visualization of combined result sets for the multiple sub-queries. The system further includes a display device configured to display the data visualization. The system also includes a user interface configured to provide the user with a capability to specify other values for the categorical portions and the numerical portions of the vocabularies.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to flexible interactive data visualization enabled by dynamic attributes.

In an embodiment, the present principles can enable end users with the following capabilities, with zero programming requirements. One such capability is interactive control flexibility to define different value segments with different value ranges, resulting in different numbers of categories and potentially new categories that are not pre-set. Another such capability is performing dynamic queries that are out of the data context of original data visualization. Out of data context includes: (i) data attributes or vocabularies not present in the current data visualization; and (ii) new data sources.

Figure 1:
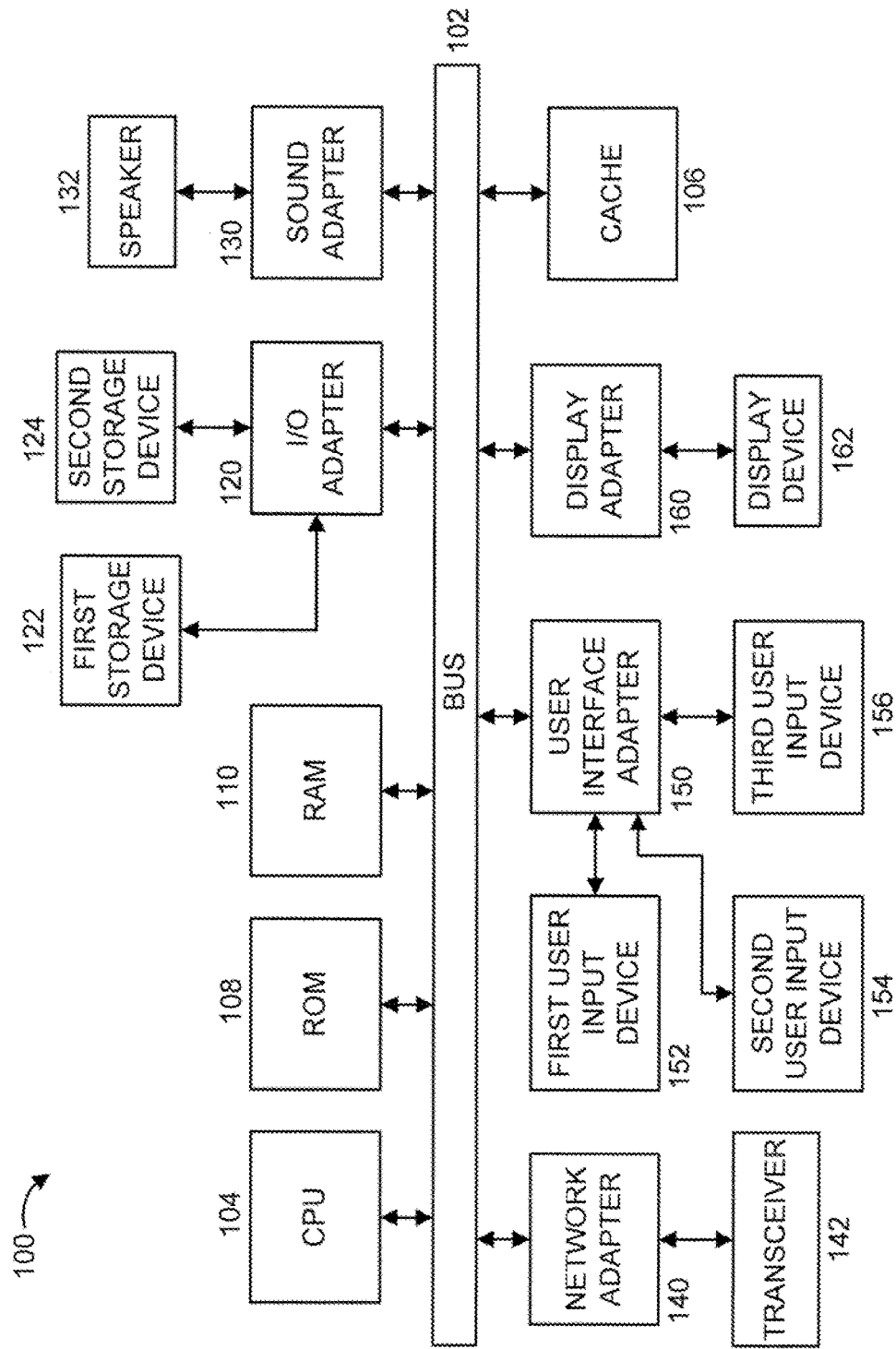
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Moreover, one or more elements of FIG. 1 can be implemented in a cloud configuration including, for example, in a distributed configuration. Additionally, one or more elements in FIG. 1 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the processing system 100 are readily contemplated by one of ordinary skill in the art given the teachings of the present principles provided herein.

Figure 2:
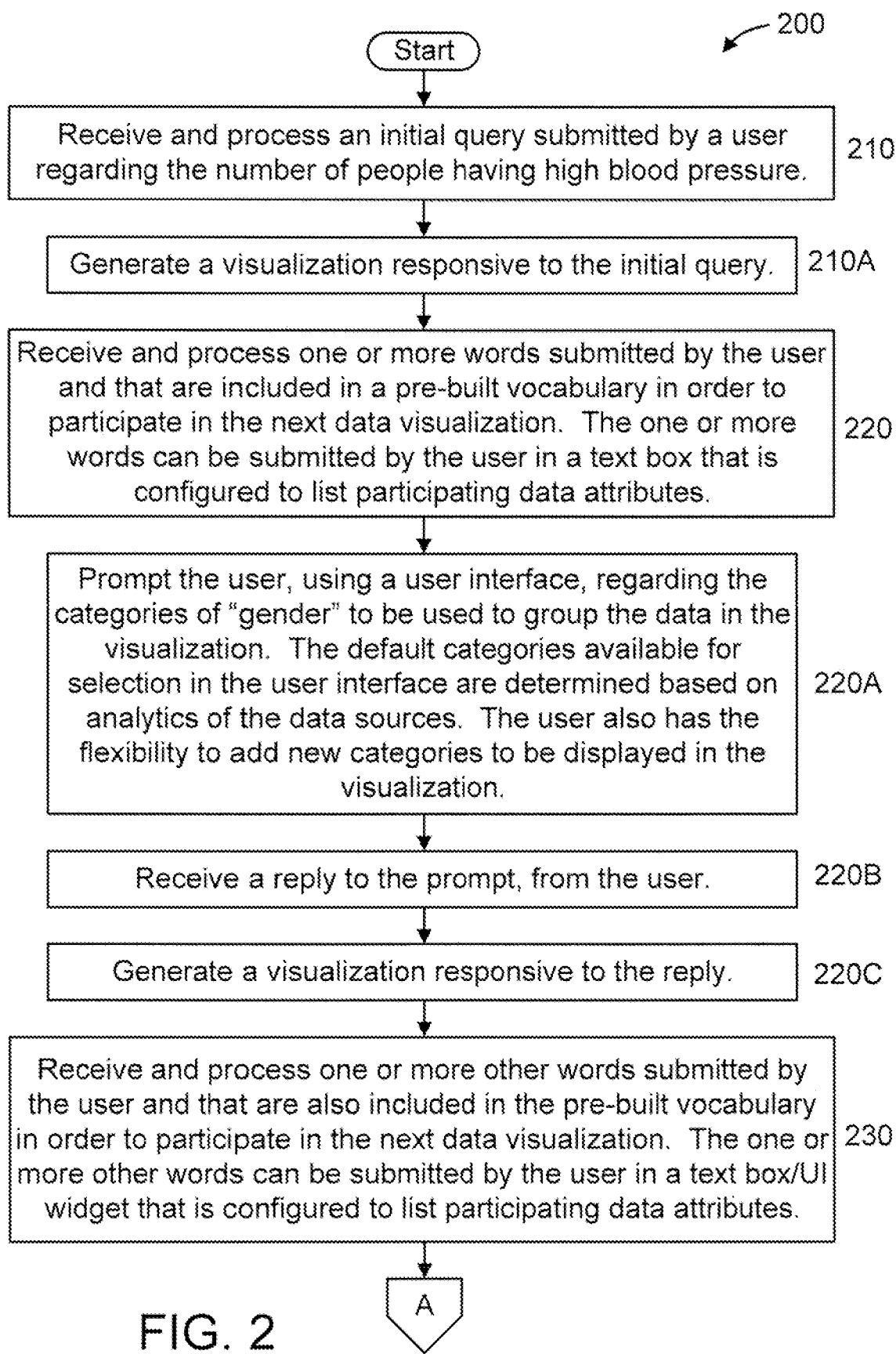
FIGS. 2-3 shows an exemplary method 200 for flexible interactive data visualization enabled by dynamic attributes, in accordance with an embodiment of the present principles.
Figure 3:
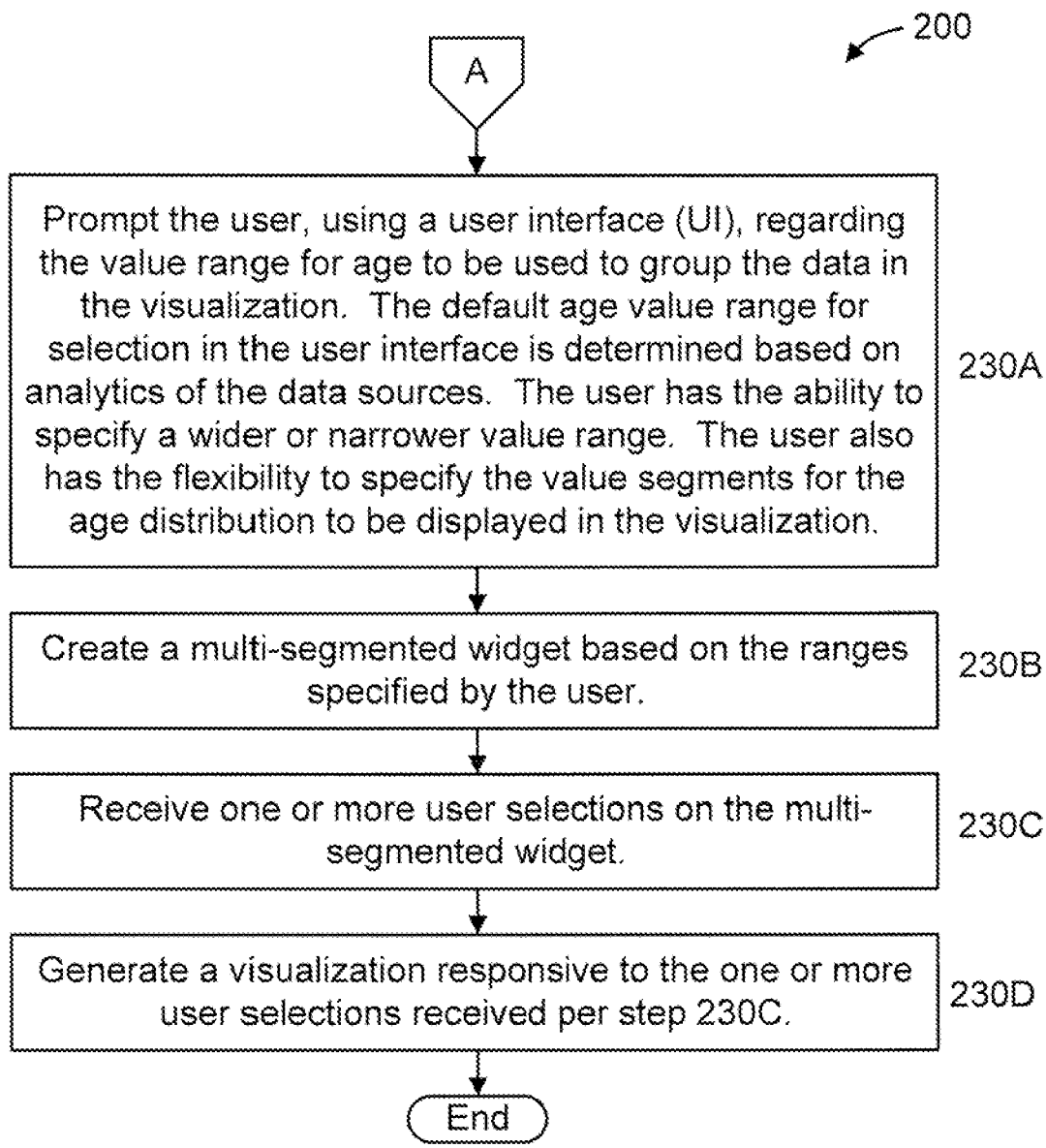
Figure 10:
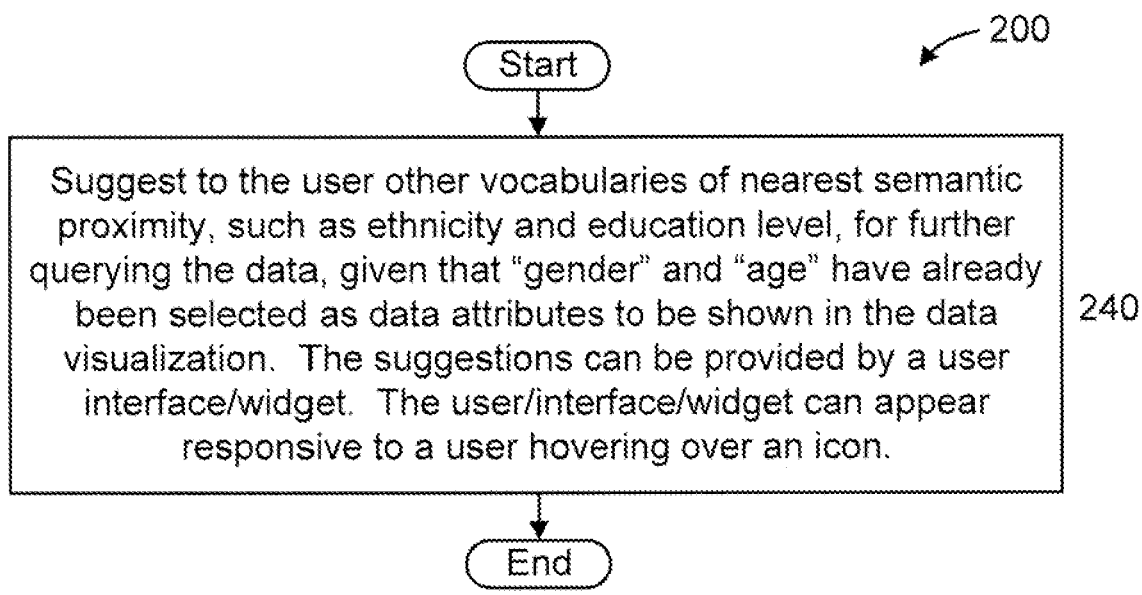
FIG. 10 shows an additional step 240 for the method 200 of FIG. 2, in accordance with an embodiment of the present principles.
Figure 12:
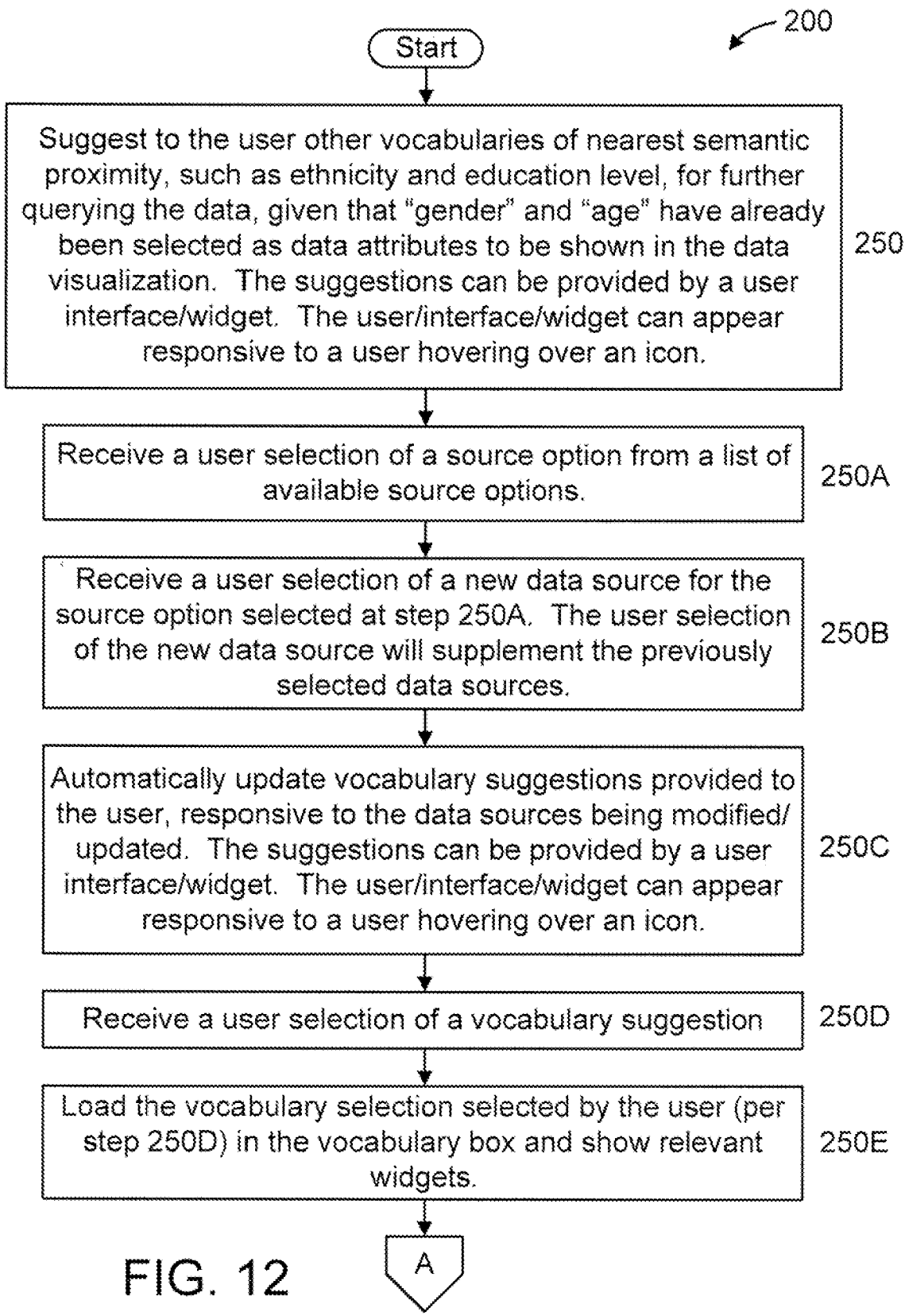
FIGS. 12-13 show an additional step 250 for the method 200 of FIG. 2, in accordance with an embodiment of the present principles.
Figure 13:
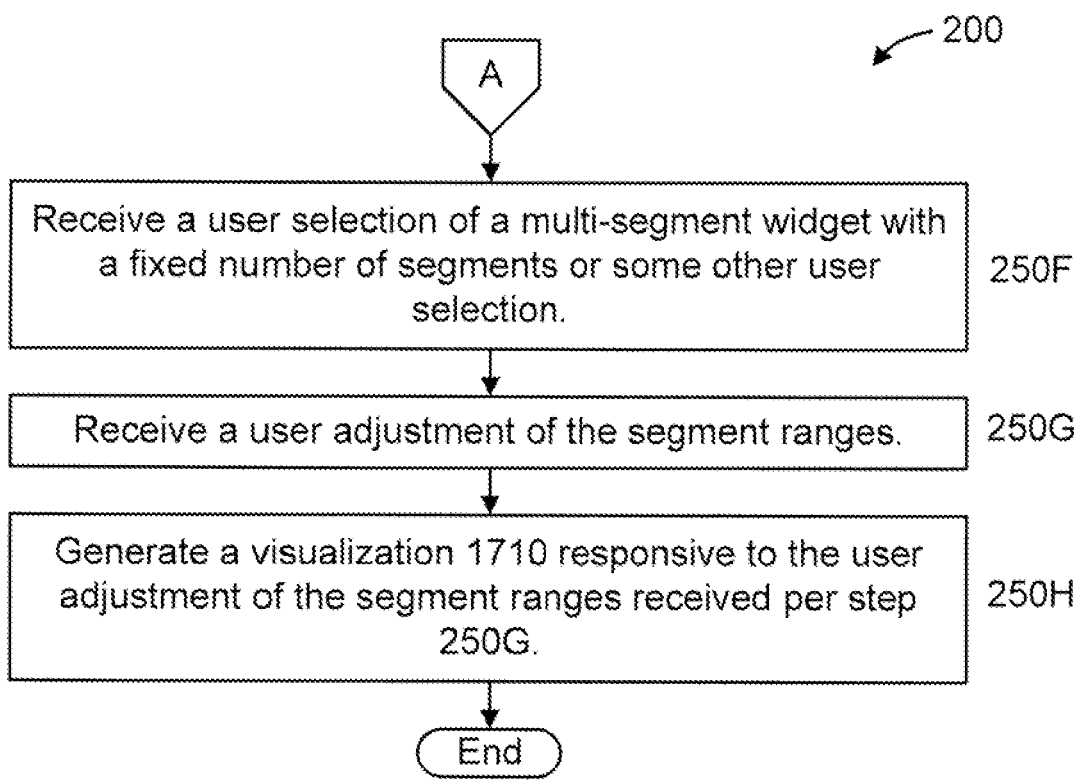

Further, it is to be appreciated that processing system 100 may perform at least part of the method described herein including, for example, at least part of method 200 of FIGS. 2-3 (including the additional steps shown in FIGS. 10 and 12-13).

FIGS. 2-3 shows an exemplary method 200 for flexible interactive data visualization enabled by dynamic attributes, in accordance with an embodiment of the present principles.

Figure 4:
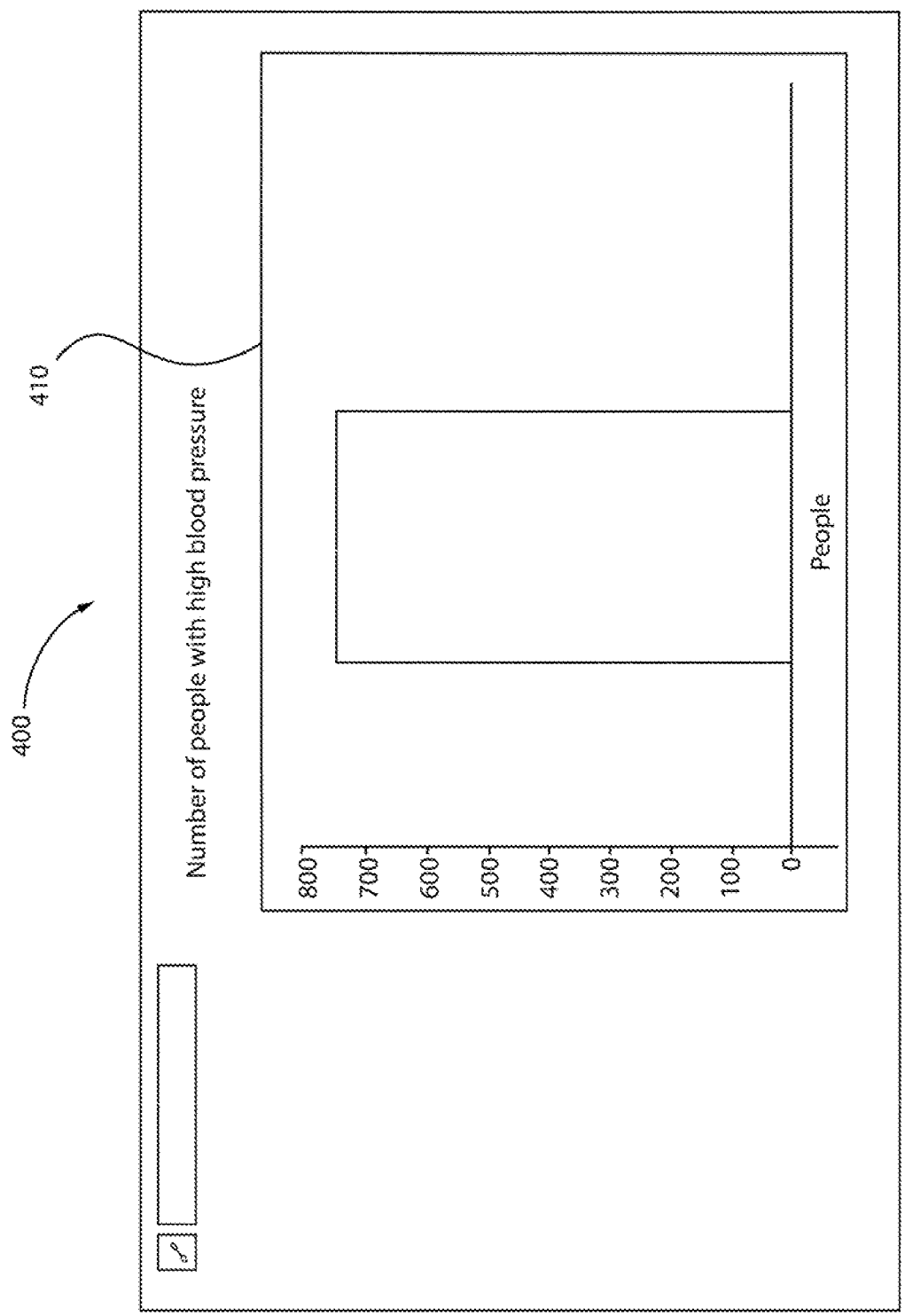
FIG. 4 shows a screenshot 400 corresponding to step 210 of FIG. 2, according to an embodiment of the present principles.

FIG. 4 shows a screenshot 400 corresponding to step 210 of FIG. 2, according to an embodiment of the present principles. In the screenshot 400, the visualization 410 generated per step 210A is depicted.

At step 210, receive and process an initial query submitted by a user regarding the number of people having high blood pressure.

In an embodiment, step 210 includes step 210A.

At step 210A, generate a visualization 410 responsive to the initial query.

Figure 5:
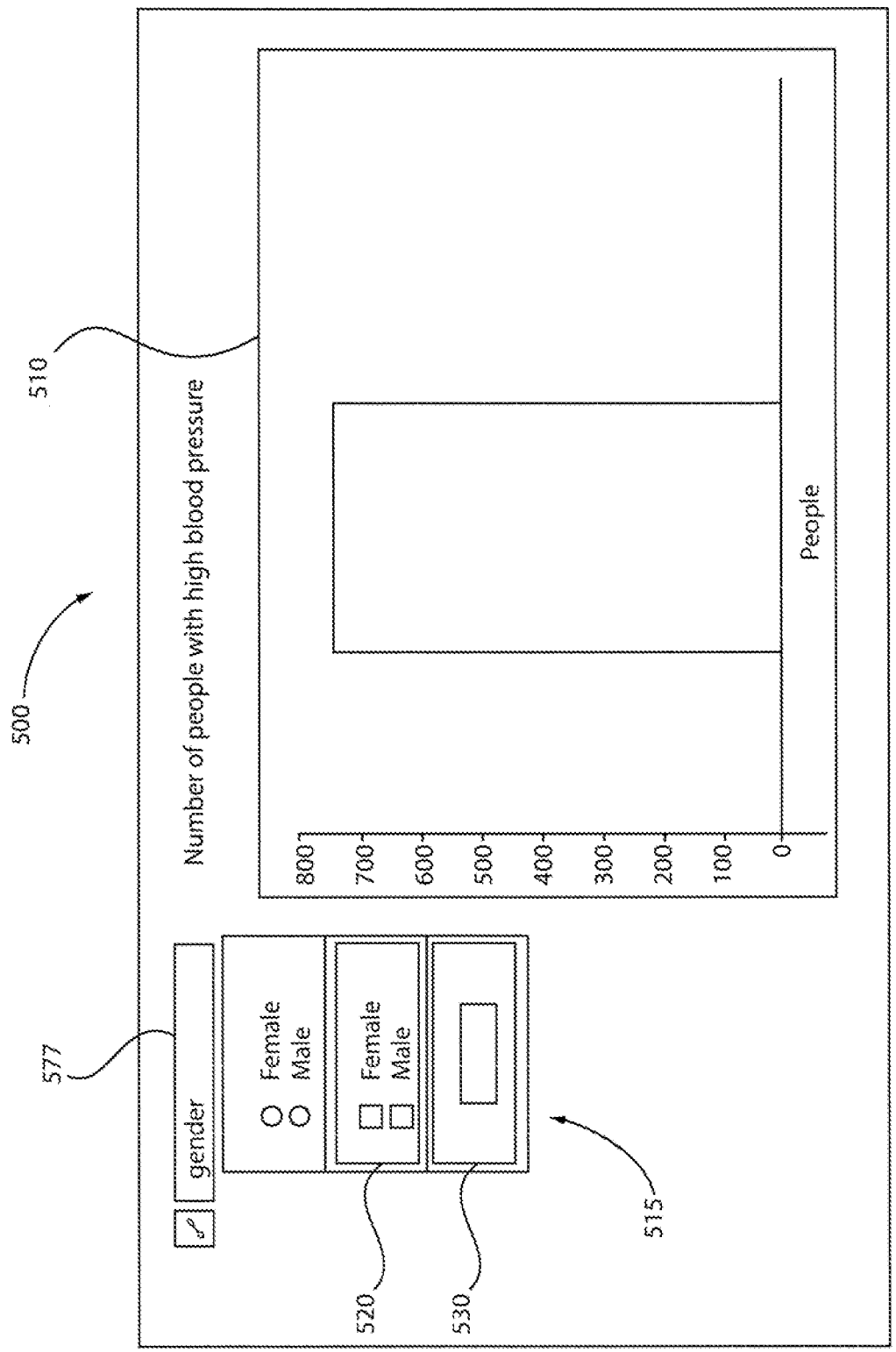
FIG. 5 shows a screenshot 500 corresponding to step 220 of FIG. 2, according to an embodiment of the present principles.

FIG. 5 shows a screenshot 500 corresponding to step 220 of FIG. 2, according to an embodiment of the present principles.

At step 220, receive and process one or more words submitted by the user and that are included in a pre-built vocabulary in order to participate in the next data visualization. The one or more words can be submitted by the user in a text box (FIG. 5, block 577) that is configured to list participating data attributes. The one or more words consist of the word "gender".

In an embodiment, step 220 includes steps 220A-220C.

At step 220A, prompt the user, using a user interface (UI) (FIG. 5, block 515), regarding the categories of "gender" to be used to group the data in the visualization. The default categories (FIG. 5, block 520) available for selection in the user interface are determined based on analytics of the data sources. The user also has the flexibility to add new categories (FIG. 5, block 530) to be displayed in the visualization.

At step 220B, receive a reply to the prompt, from the user.

Figure 6:
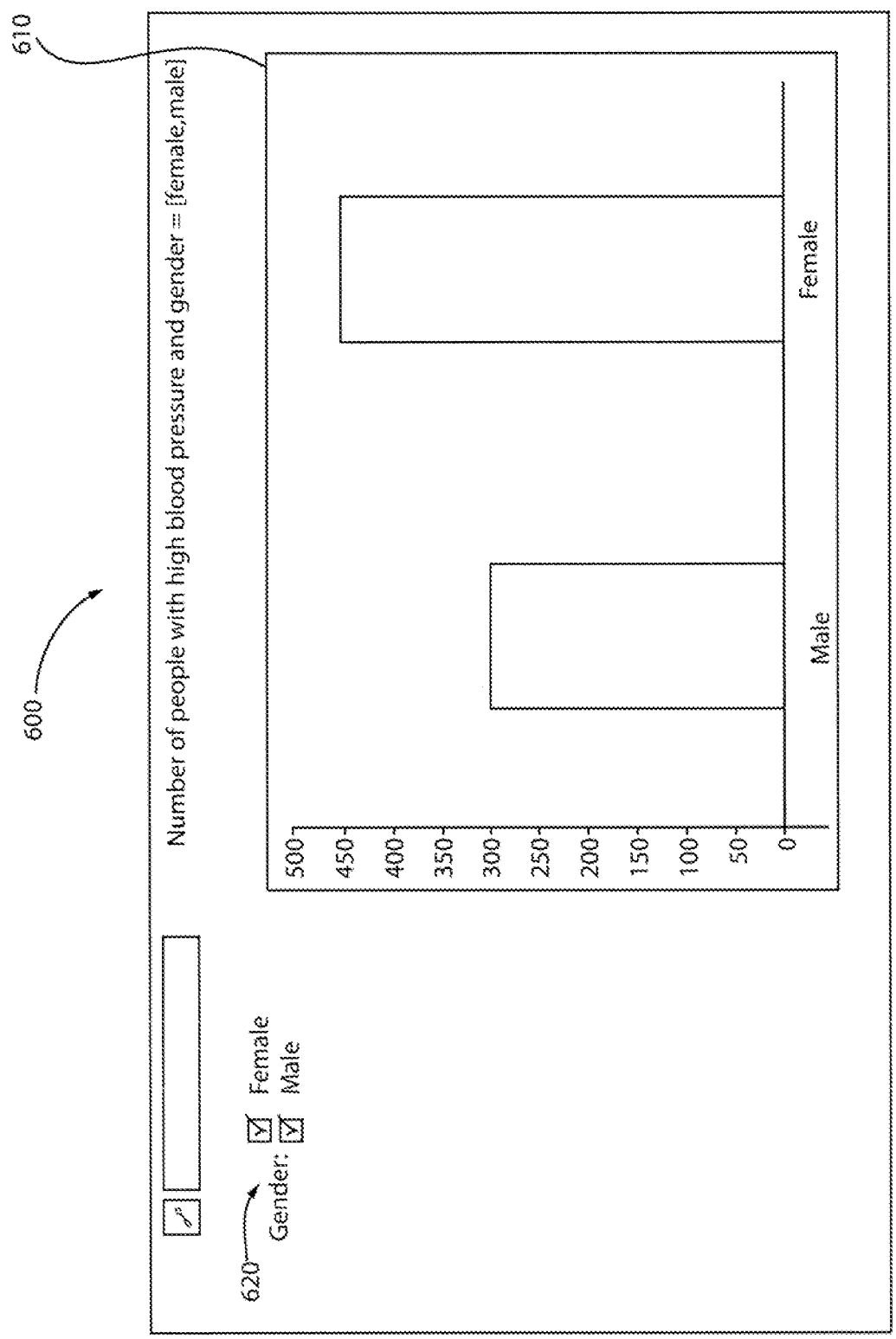
FIG. 6 shows a screenshot 600 corresponding to step 220C of FIG. 2, in accordance with an embodiment of the present principles.

FIG. 6 shows a screenshot 600 corresponding to step 220C of FIG. 2, in accordance with an embodiment of the present principles. In the screenshot 600, the visualization 610 generated per step 220C is depicted. The visualization 610 corresponds to the reply received at step 220B selecting both "Female" and "Male" for gender.

At step 220C, generate a visualization 610 responsive to the reply.

Figure 7:
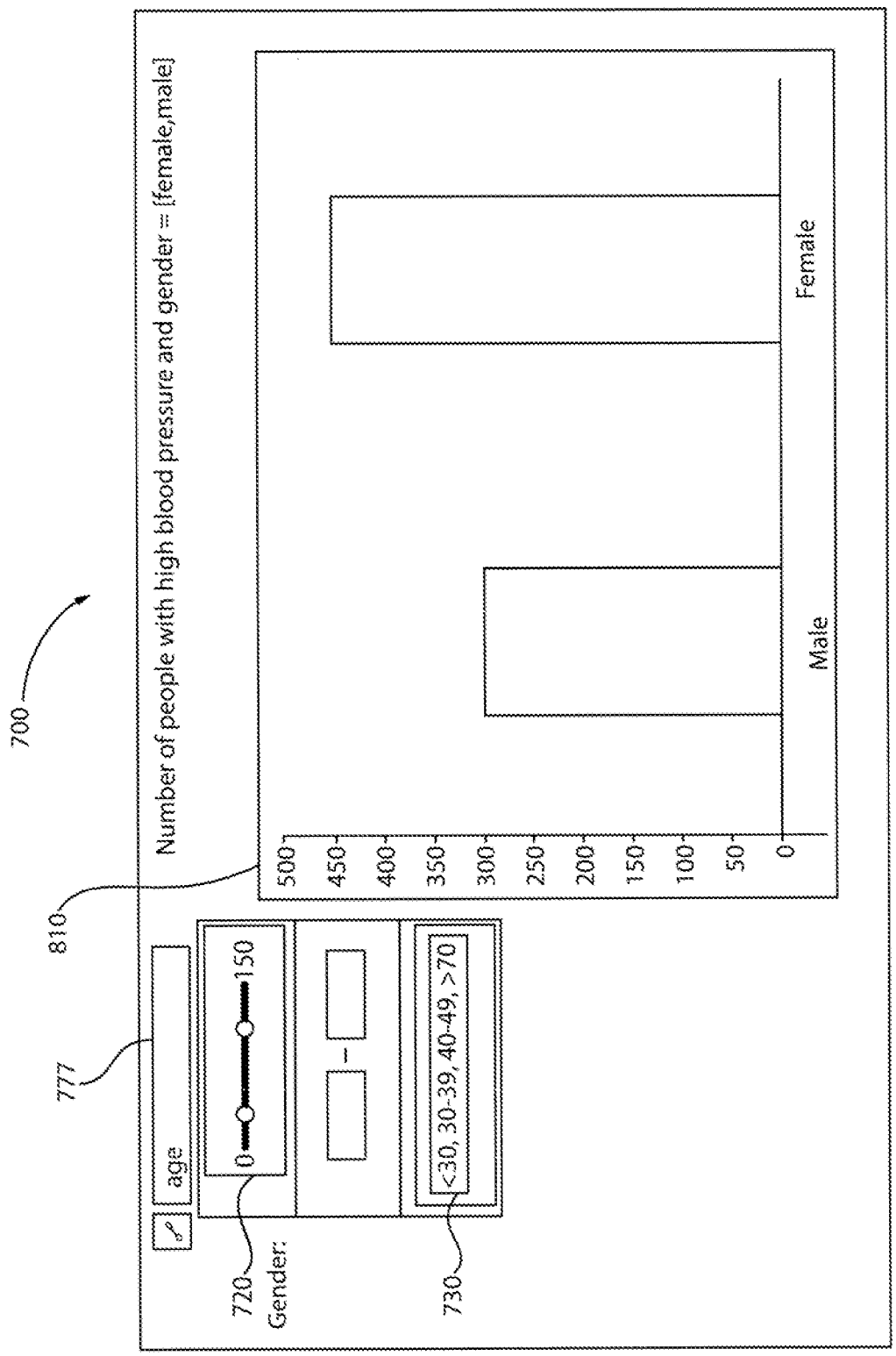
FIG. 7 shows a screenshot 700 corresponding to step 230 of FIG. 2, according to an embodiment of the present principles.

FIG. 7 shows a screenshot 700 corresponding to step 230 of FIG. 2, according to an embodiment of the present principles.

At step 230, receive and process one or more other words submitted by the user and that are also included in the pre-built vocabulary in order to participate in the next data visualization. The one or more other words can be submitted by the user in a text box/UI widget (FIG. 7, block 777) that is configured to list participating data attributes. The one or more other words consist of the word "age", corresponding to the user's intent to know the age distribution from the current blood pressure visualization.

In an embodiment, step 230 includes steps 230A-230D.

At step 230A, prompt the user, using a user interface (UI), regarding the value range for age to be used to group the data in the visualization. The default age value range for selection in the user interface is determined based on analytics of the data sources. However, the user has the ability to specify a wider or narrower value range (FIG. 7, block 720). The user also has the flexibility to specify the value segments for the age distribution (FIG. 7, block 730) to be displayed in the visualization. For example, the value segments could be "<30, 30-39, 40-49, >70".

Figure 8:
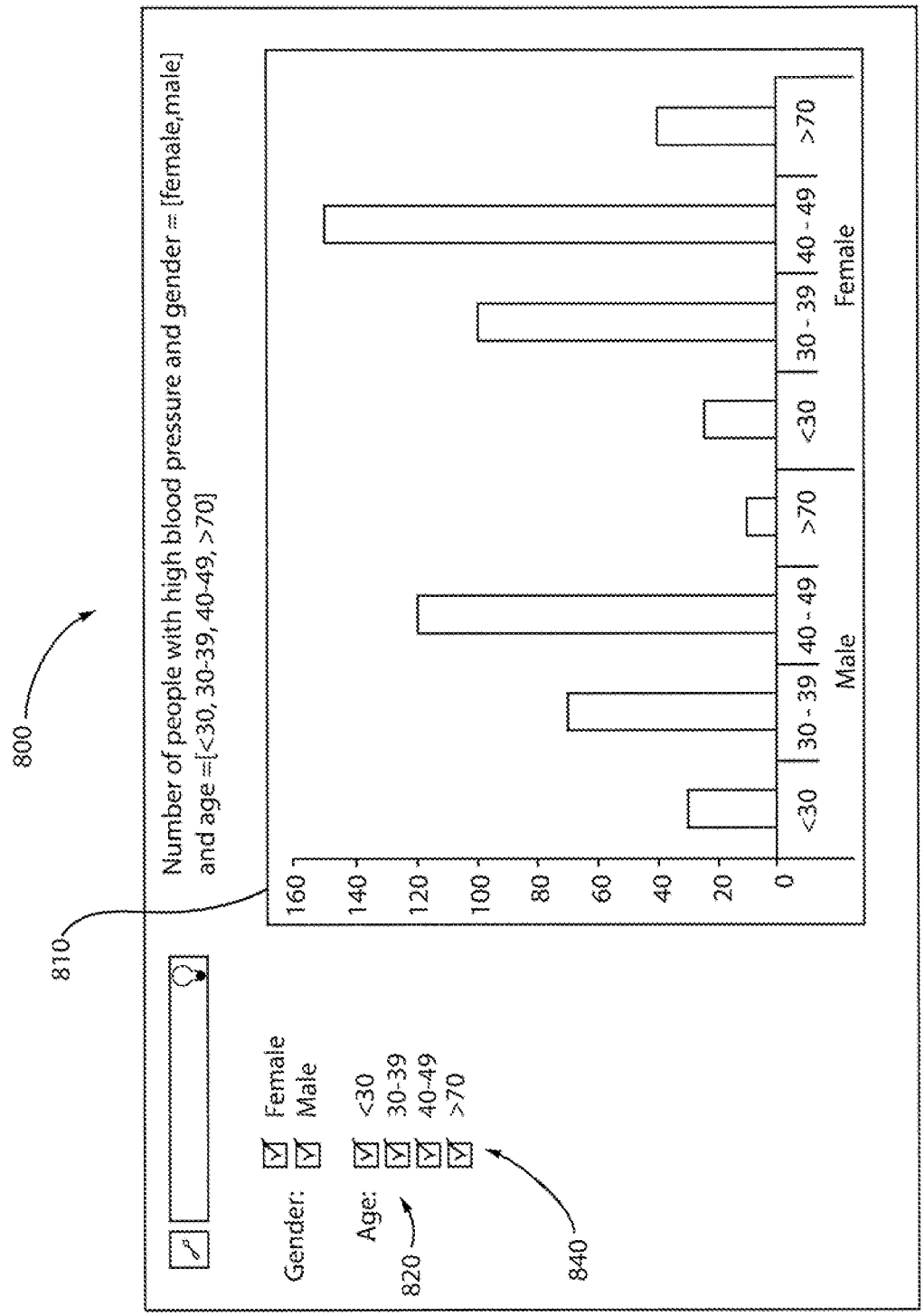
FIG. 8 shows a screenshot 800 corresponding to steps 230B, 230C, and 230D of FIG. 3, according to an embodiment of the present principles.

FIG. 8 shows a screenshot 800 corresponding to steps 230B, 230C, and 230D of FIG. 3, according to an embodiment of the present principles. In the screenshot 800, the visualization 810 generated per step 230C is depicted.

At step 230B, create a multi-segmented widget (FIG. 8, block 820) based on the ranges specified by the user.

At step 230C, receive one or more user selections (FIG. 8, block 840) on the multi-segmented widget.

At step 230D, generate a visualization 810 responsive to the one or more user selections received per step 230C.

A description will now be given regarding how end users are enabled, without programming requirements, to select data ranges and segments, in accordance with an embodiment of the present principles.

Figure 9:
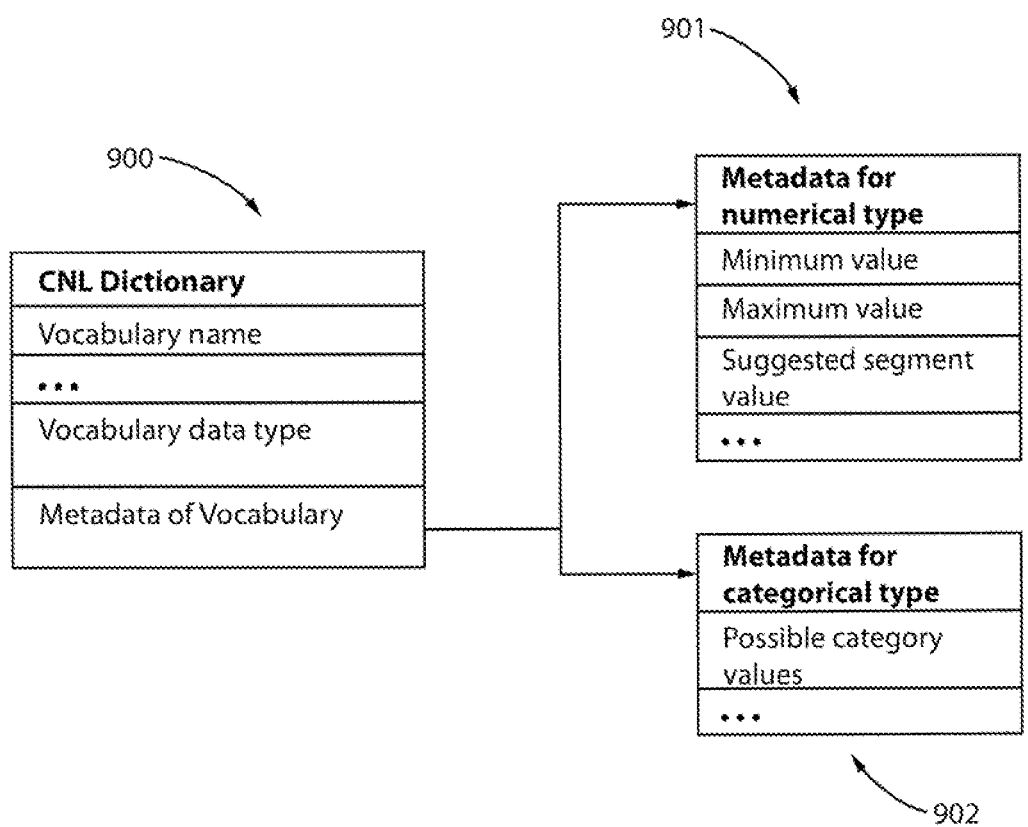
FIG. 9 shows a constrained natural language dictionary 900 for use by the present principles, in accordance with an embodiment of the present principles.

In this scenario, steps 220 and 230 of FIG. 2 are enabled by having a constrained natural language (CNL) dictionary. FIG. 9 shows a constrained natural language dictionary 900 for use by the present principles, in accordance with an embodiment of the present principles. The constrained natural language dictionary 900 includes a list of vocabularies that reference the following:

1. Pre-built data mapping that allows end users to access data subsets using just the natural language vocabularies without a DBA task. Therefore, it meets non-programming requirements on the end users' side.

2. System generated metadata 901 and 902 of the vocabularies, that augment the existing CNL dictionary to:

(i) dynamically determine category values (for categorical vocabularies) and numerical values (for numerical vocabularies) of the vocabularies through data analytics (Hence, the initial values for user interface/widget 520 and user interface/widget 720 in step 220 and step 230, respectively, can be displayed).

(ii) store the value segments specified by the users in user interface/widget 530 and user interface/widget 730.

Regarding category values, the same can include categories as values, while for numerical values, the same can include number (minimum, maximum, average, and so forth) as values.

Since the value segments are determined by the users, the informatics queries to the data sources have to be dynamically generated for each of the value segments and the resulting data visualization will be combining the result sets from each of the sub-queries of the value segments.

Figure 11:
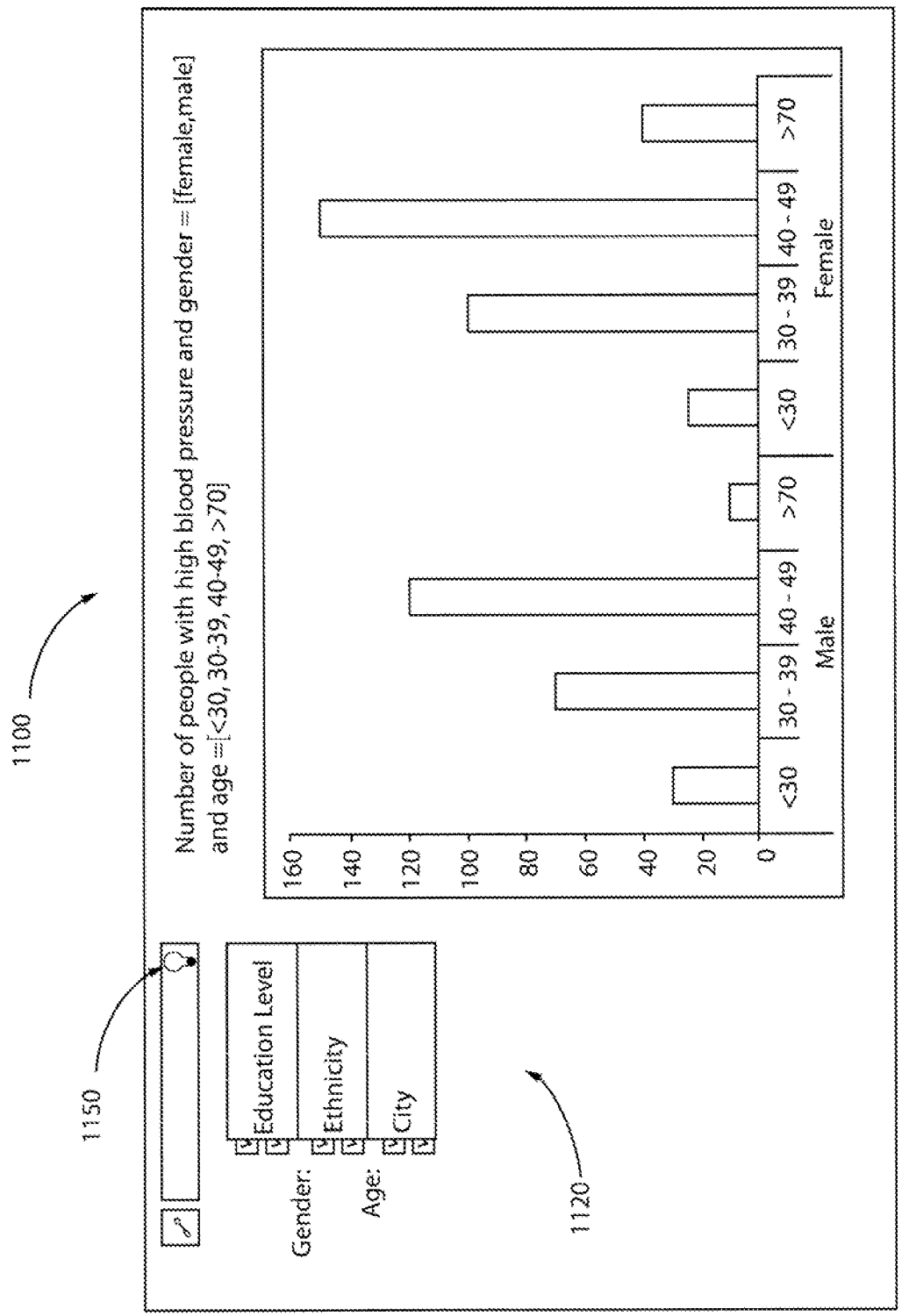
FIG. 11 shows a screenshot 1100 corresponding to step 240 of FIG. 10, according to an embodiment of the present principles.

FIG. 10 shows an additional step 240 for the method 200 of FIG. 2, in accordance with an embodiment of the present principles. FIG. 11 shows a screenshot 1100 corresponding to step 240 of FIG. 10, according to an embodiment of the present principles.

At step 240, suggest to the user other vocabularies of nearest semantic proximity, such as ethnicity and education level, for further querying the data, given that "gender" and "age" have already been selected as data attributes to be shown in the data visualization. In an embodiment, the suggestions can be provided by a user interface/widget (FIG. 11, block 1120). In an embodiment, the user/interface/widget can appear responsive to a user hovering over an icon (FIG. 11, block 1150). In an embodiment, the icon is embodied as a lightbulb.

A description will now be given regarding performing dynamic queries with vocabularies that are out of the data context of the original (initial) data visualization, without programming requirements, to select data ranges and segments, in accordance with an embodiment of the present principles.

By using an existing lexical database, such as WordNet, for a given set of vocabularies, vocabularies in the same CNL dictionary that are of nearest semantic proximity can be identified and suggested to the users.

The suggestions can include, but are not limited to, the following: (i) vocabularies with close semantic distance; (ii) related concepts/words; and (iii) usage statistics.

Regarding the suggestions relating to (i), consider the following example. "Age" and "Gender" are selected vocabularies that belongs to the concept "Person". From the lexical database, "ethnicity" and "education level" are attributes associated with "Person" and also have close semantic distances with the selected vocabularies.

Regarding the suggestions relating to (ii), consider the following example. "Person" and "Location" are related, so attributes of "location" would also be suggested.

Regarding the suggestions relating to (iii), consider the following example. All end users who selected "Age" would 90% of time select "Education level". Hence, "Education level" would be suggested.

FIGS. 12-13 show an additional step 250 for the method 200 of FIG. 2, in accordance with an embodiment of the present principles. FIGS. 12-13 and step 250 relate to the following scenario. Logically the user knows there is a correlation between blood pressure and blood sugar, but this correlation is not shown in the suggestions provided by the present principles in step 240. The user wants to go beyond the suggestions in step 204 to add a new source of data such as blood sugar. The user adds a blood sugar data source and this shows up in the list of suggestions and the user then chooses this new data source. The user wants to pull in this data source into the existing data visualization and automatically adjust the resulting graph.

At step 250, add another data source to the existing data visualization and automatically adjust the resulting graph.

In an embodiment, step 250 includes steps 250A-250D.

Figure 14:
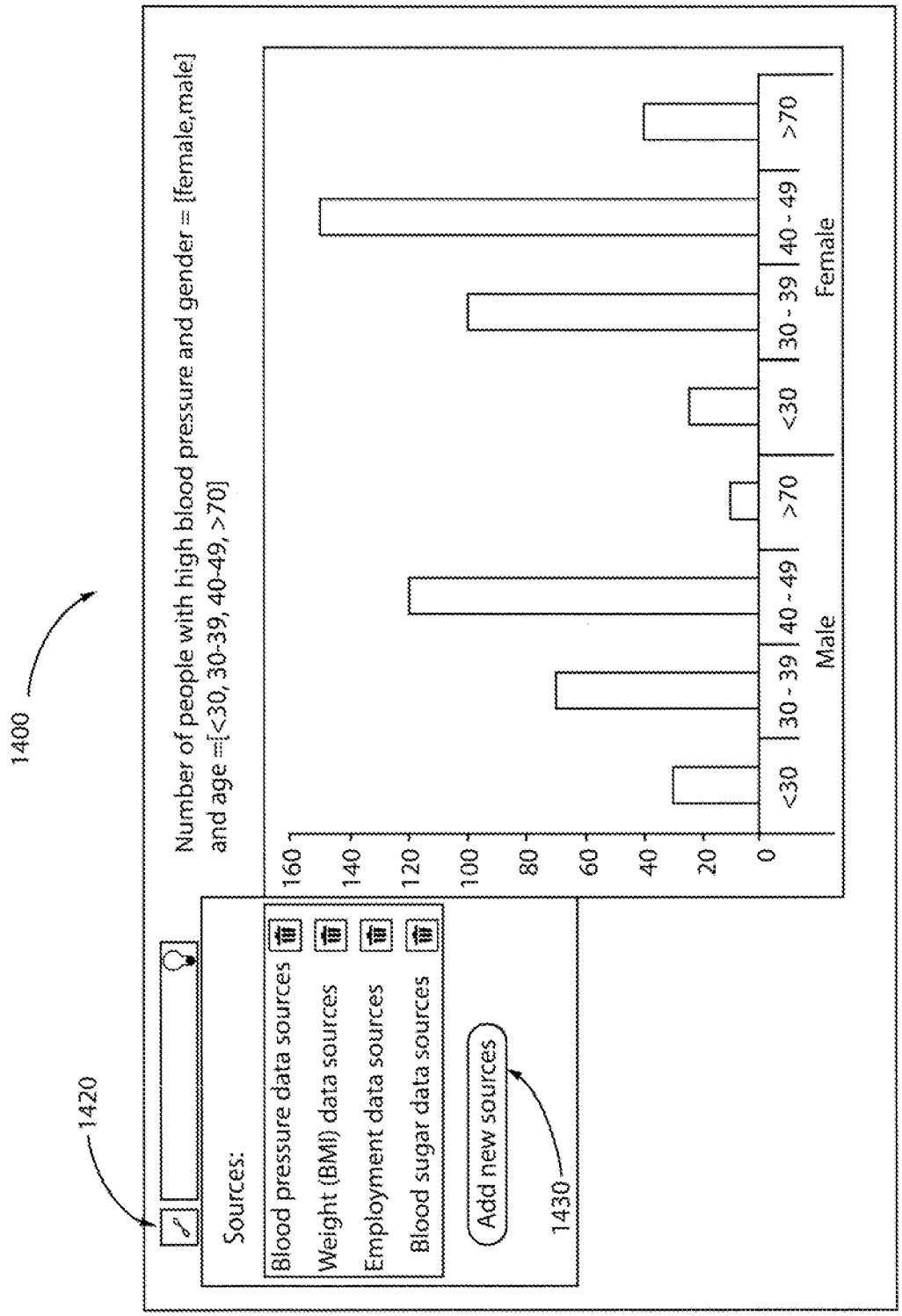
FIG. 14 shows a screenshot 1400 corresponding to steps 250A and 250B of FIG. 12, according to an embodiment of the present principles.

FIG. 14 shows a screenshot 1400 corresponding to steps 250A and 250B of FIG. 12, according to an embodiment of the present principles.

At step 250A, receive a user selection of a source option from a list of available source options (FIG. 14, block 1420).

At step 250B, receive a user selection of a new data source for the source option selected at step 250A (FIG. 14, block 1430). The user selection of the new data source will supplement the previously selected data sources (for blood pressure).

Figure 15:
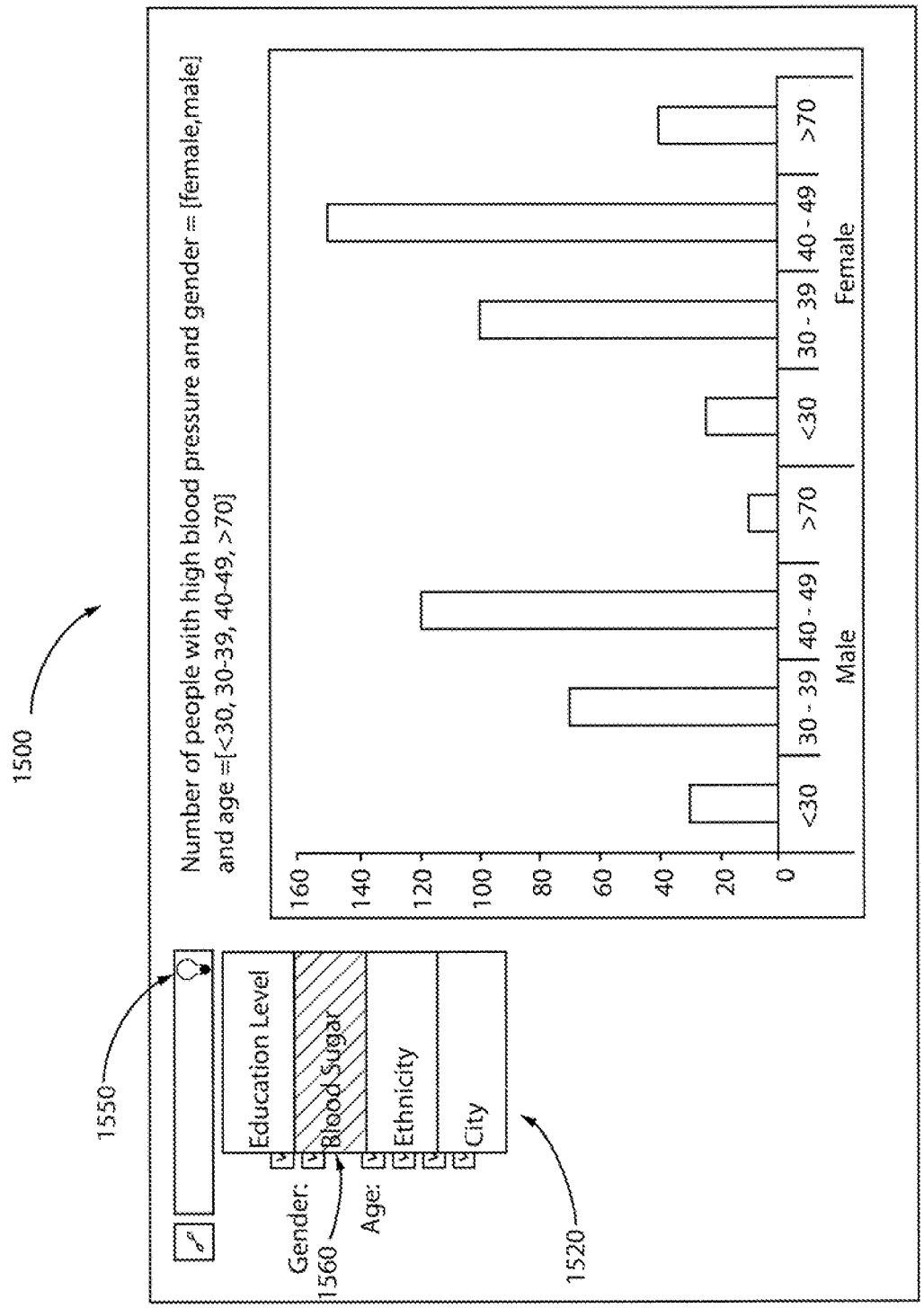
FIG. 15 shows a screenshot 1500 corresponding to steps 250C and 250D of FIG. 12, according to an embodiment of the present principles.

FIG. 15 shows a screenshot 1500 corresponding to steps 250C and 250D of FIG. 12, according to an embodiment of the present principles.

At step 250C, automatically update vocabulary suggestions provided to the user, responsive to the data sources being modified/updated. In an embodiment, the suggestions can be provided by a user interface/widget (FIG. 15, block 1520). In an embodiment, the user/interface/widget can appear responsive to a user hovering over an icon (FIG. 15, block 1550).

At step 250D, receive a user selection of a vocabulary suggestion (FIG. 15, block 1560).

Figure 16:
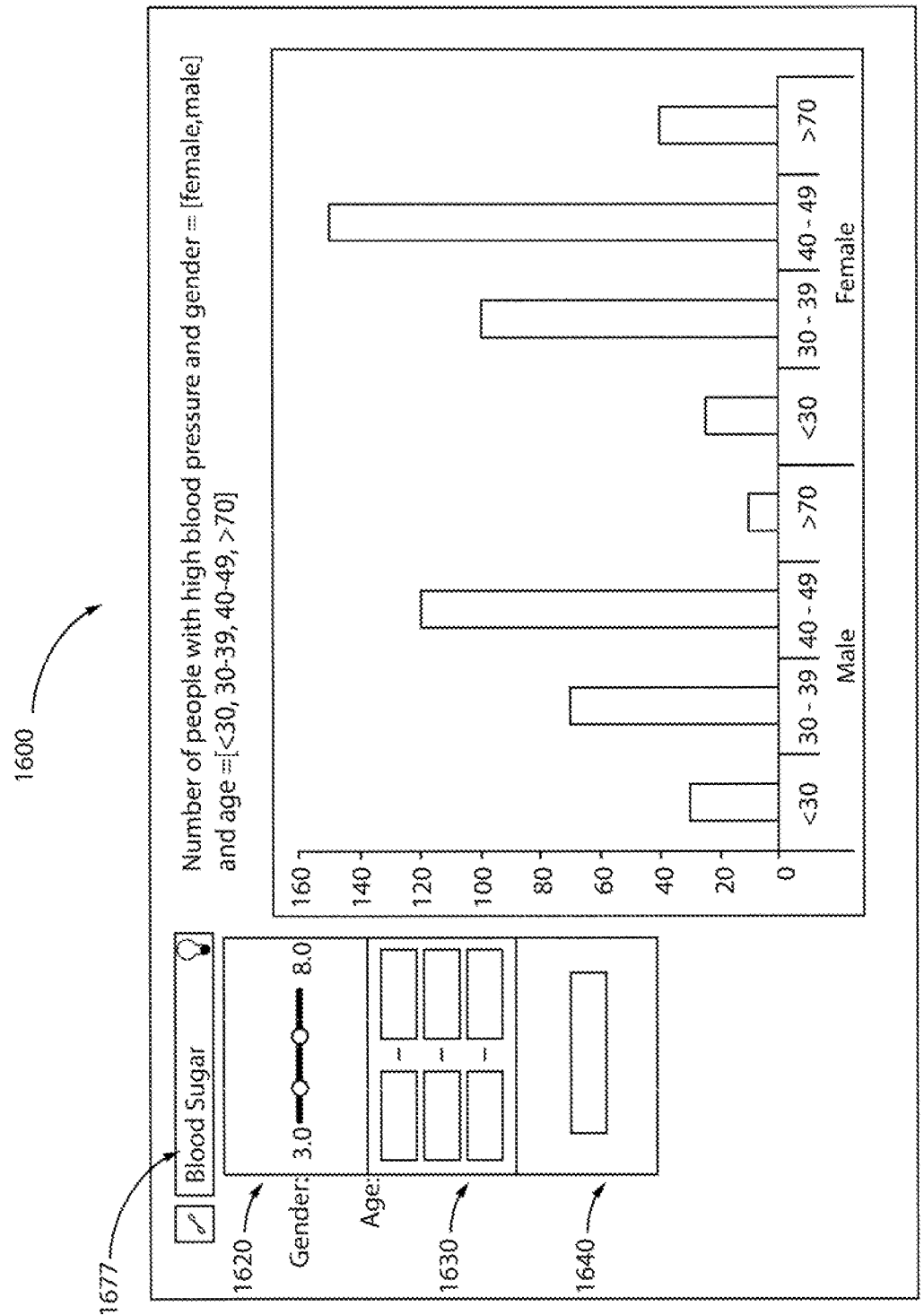
FIG. 16 shows a screenshot 1600 corresponding to steps 250E and 250F of FIGS. 12 and 13, respectively, according to an embodiment of the present principles.

FIG. 16 shows a screenshot 1600 corresponding to steps 250E and 250F of FIGS. 12 and 13, respectively, according to an embodiment of the present principles.

At step 250E, load the vocabulary selection selected by the user (per step 250D) in the vocabulary box (FIG. 16, block 1677) and show relevant widgets (FIG. 16, block 1620).

At step 250F, receive a user selection of a multi-segment widget with a fixed number of segments (FIG. 16, block 1630) or some other user selection (FIG. 16, block 1640).

Figure 17:
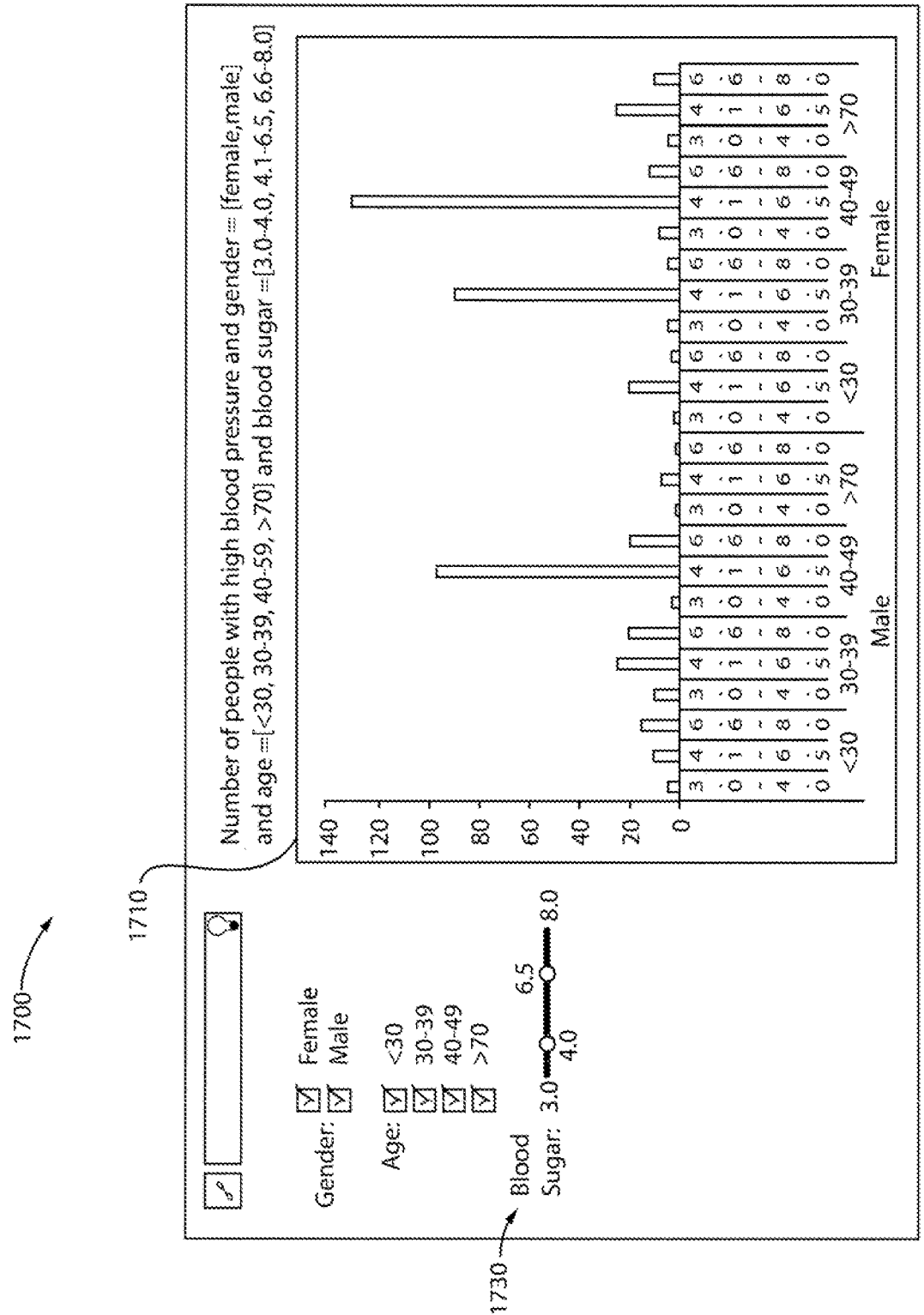
FIG. 17 shows a screenshot 1700 corresponding to steps 250G and 250H of FIG. 13, according to an embodiment of the present principles.

FIG. 17 shows a screenshot 1700 corresponding to steps 250G and 250H of FIG. 13, according to an embodiment of the present principles.

At step 250G, receive a user adjustment of the segment ranges (FIG. 17, block 1730).

At step 250H, generate a visualization 1710 responsive to the user adjustment of the segment ranges received per step 250G.

Hence, as a result, the combined data visualization for blood pressure and blood sugar level is displayed according to the specified criteria. Also, with the new data source, there might be changes in the value range and segments, and our system would perform validation and warn users of possible updates required.

When adding new data source such as "blood sugar", we would validate if the sample population for the "blood sugar" fully or partially match that of the "blood pressure" group. If the two sample populations do not match (e.g. no overlap at all), our system would give end users a warning (since the new data source would have no effect on the current graph).

A description will now be given regarding performing dynamic queries with data sources that are out of the data context of original data visualization, in accordance with an embodiment of the present principles.

On the server, there is a data source registry that keeps track of all the data sources. It includes the following information (but not limited to): (i) data source name; (ii) location of the data sources (e.g., Java DataBase Connectivity (JDBC) Uniform Resource Locator (URL) for databases); (iii) credentials to access the data sources; and (iv) subdomain (e.g., blood pressure for Canadian population, blood sugar level for West Coast Canadian population, and so forth).

It's the Information Technology (IT) manager's job to register the data sources into the data source registry, because they are the user groups that have that information. Consequently, when the user wants to add more data sources to be shown in the data visualization for step 250, the user can select them from the data source list retrieved from that data source registry. Data sources that are not registered in the data registry would not be visible for users to select.

After selecting the data sources for use in the visualization, a query is submitted to the new data sources to get the query results to be rendered in the existing visualization.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
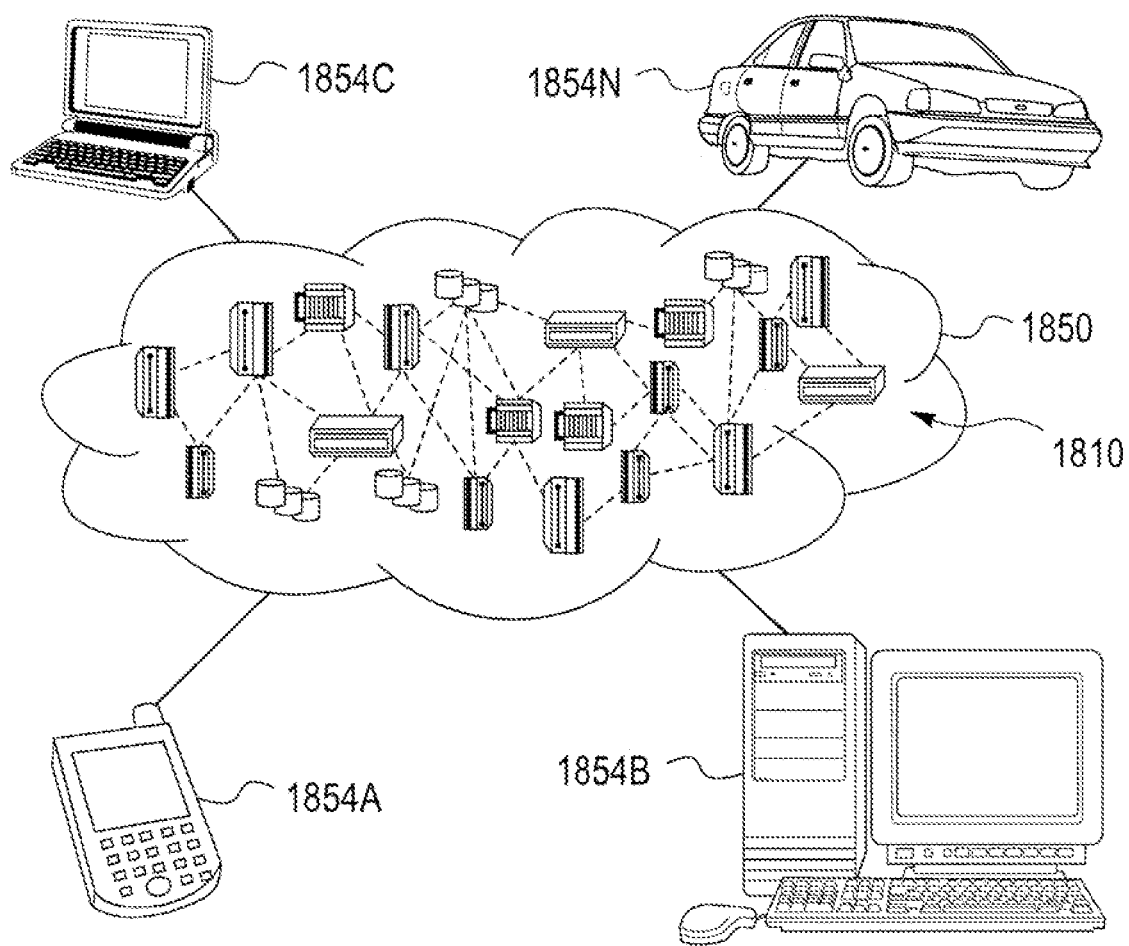
FIG. 18 shows an exemplary cloud computing environment, in accordance with an embodiment of the present principles.

Referring now to FIG. 18, illustrative cloud computing environment 1850 is depicted. As shown, cloud computing environment 1850 includes one or more cloud computing nodes 1810 with which local computing devices used by cloud consumers, such as, for example, personal digital assistant (PDA) or cellular telephone 1854A, desktop computer 1854B, laptop computer 1854C, and/or automobile computer system 1854N may communicate. Nodes 1810 may communicate with one another. They may be grouped (not shown) physically or virtually, in one or more networks, such as Private, Community, Public, or Hybrid clouds as described hereinabove, or a combination thereof. This allows cloud computing environment 1850 to offer infrastructure, platforms and/or software as services for which a cloud consumer does not need to maintain resources on a local computing device. It is understood that the types of computing devices 1854A-N shown in FIG. 18 are intended to be illustrative only and that computing nodes 1810 and cloud computing environment 1850 can communicate with any type of computerized device over any type of network and/or network addressable connection (e.g., using a web browser).

Figure 19:
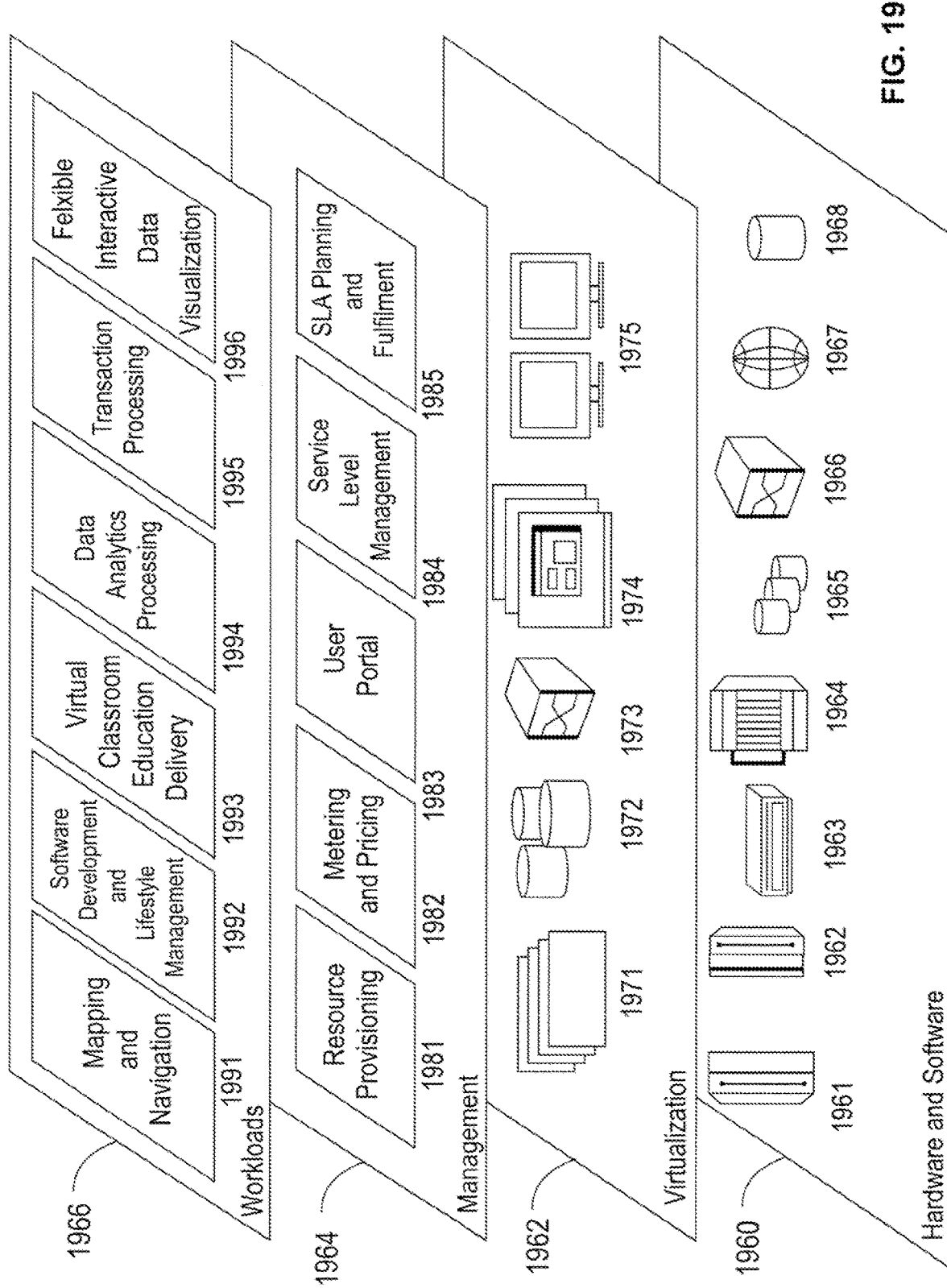
FIG. 19 shows an exemplary set of functional abstraction layers provided by the cloud computing environment shown in FIG. 18, in accordance with an embodiment of the present principles.

Referring now to FIG. 19, a set of functional abstraction layers provided by cloud computing environment 1850 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 1960 includes hardware and software components. Examples of hardware components include: mainframes 1961; RISC (Reduced Instruction Set Computer) architecture based servers 1962; servers 1963; blade servers 1964; storage devices 1965; and networks and networking components 1966. In some embodiments, software components include network application server software 1967 and database software 1968.

Virtualization layer 1970 provides an abstraction layer from which the following examples of virtual entities may be provided: virtual servers 1971; virtual storage 1972; virtual networks 1973, including virtual private networks; virtual applications and operating systems 1974; and virtual clients 1975.

In one example, management layer 1980 may provide the functions described below. Resource provisioning 1981 provides dynamic procurement of computing resources and other resources that are utilized to perform tasks within the cloud computing environment. Metering and Pricing 1982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1983 provides access to the cloud computing environment for consumers and system administrators. Service level management 1984 provides cloud computing resource allocation and management such that required service levels are met. Service Level Agreement (SLA) planning and fulfillment 1985 provide pre-arrangement for, and procurement of, cloud computing resources for which a future requirement is anticipated in accordance with an SLA.

Workloads layer 1990 provides examples of functionality for which the cloud computing environment may be utilized. Examples of workloads and functions which may be provided from this layer include: mapping and navigation 1991; software development and lifecycle management 1992; virtual classroom education delivery 1993; data analytics processing 1994; transaction processing 1995; and flexible interactive data visualization enabled by dynamic attributes 1996.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for interactive data visualization, comprising:
    dynamically determining, by a hardware processor responsive to a user request directed to at least one of default categories identified by analyzing a data source used with an initial user query, pre-set values for categorical portions and numerical portions of vocabularies for user selection using data analytics on the data source;
    providing, by a user interface, the user with a capability to specify other values for the categorical portions and the numerical portions of the vocabularies;
    dynamically generating, by the hardware processor, multiple sub-queries to the data source for the pre-set values and at least one of the other values specified by the user for the categorical portions and numerical portions of the vocabularies; and
    generating, by the hardware processor, a data visualization of combined result sets for the multiple sub-queries and displaying the data visualization on a display device.

2. The method of claim 1, wherein at least one of the multiple sub-queries is out of the data context of the initial query by involving data attributes or vocabulary words uninvolved in the initial query.

3. The method of claim 1, wherein at least one of the multiple sub-queries is out of the data context of the initial query by involving a new data source.

4. The method of claim 1, further comprising accessing, by the hardware processor, a constrained natural language dictionary comprising the vocabularies, wherein the vocabularies are configured to reference pre-built data mappings, the pre-built data mappings being configured to enable user access to data subsets of the data source using the vocabularies and computer generated metadata of the vocabularies to augment the constrained natural language dictionary.

5. The method of claim 4, wherein said accessing step comprises generating the constrained natural language dictionary responsive to the initial query.

6. The method of claim 4, wherein said accessing step comprises configuring the constrained natural language dictionary responsive to the initial query.

7. The method of claim 4, wherein said accessing step is performed as part of said determining step.

8. The method of claim 4, further comprising prompting the user with additional categories of nearest semantic proximity for further querying of the data source.

9. The method of claim 8, wherein said prompting step comprises identifying and suggesting to the user, other vocabularies in the constrained natural language dictionary within a semantic proximity threshold to the vocabularies in the list.

10. The method of claim 9, wherein said identifying step is performed using a predetermined existing lexical database for a set of vocabularies that include the vocabularies and the other vocabularies.

11. The method of claim 9, wherein the semantic proximity threshold is based on at least one selected from the group of a semantic distance, a related word, a related concept, usage statistics.

12. The method of claim 1, further comprising:
    performing a validation process and sending a notification to the user when an update to the values specified by the user is required and when a new data source has no overlap with the data source; and
    adding the new data source to a data source registry and enabling access to the new data source, responsive to a positive result for the validation process.

13. A computer program product for interactive data visualization, the computer program product comprising a non-transitory computer readable storage medium having program instructions embodied therewith, the program instructions executable by a computer to cause the computer to perform a method comprising:
    dynamically determining, by a hardware processor responsive to a user request directed to at least one of default categories identified by analyzing a data source used with an initial user query, pre-set values for categorical portions and numerical portions of vocabularies for user selection using data analytics on the data source;
    providing, by a user interface, the user with a capability to specify other values for the categorical portions and the numerical portions of the vocabularies;
    dynamically generating, by the hardware processor, multiple sub-queries to the data source for the pre-set values and at least one of the other values specified by the user for the categorical portions and numerical portions of the vocabularies; and
    generating, by the hardware processor, a data visualization of combined result sets for the multiple sub-queries and displaying the data visualization on a display device.

14. The computer program product of claim 13, wherein at least one of the multiple sub-queries is out of the data context of the initial query by involving data attributes or vocabulary words uninvolved in the initial query.

15. The computer program product of claim 13, wherein at least one of the multiple sub-queries is out of the data context of the initial query by involving a new data source.

16. The computer program product of claim 13, further comprising accessing, by the hardware processor, a constrained natural language dictionary comprising the vocabularies, wherein the vocabularies are configured to reference pre-built data mappings, the pre-built data mappings being configured to enable user access to data subsets of the data source using the vocabularies and computer generated metadata of the vocabularies to augment the constrained natural language dictionary.

17. The computer program product of claim 16, further comprising prompting the user with additional categories of nearest semantic proximity for further querying of the data source.

18. The computer program product of claim 17, wherein said prompting step comprises identifying and suggesting to the user, other vocabularies in the constrained natural language dictionary within a semantic proximity threshold to the vocabularies in the list.

19. The computer program product of claim 18, wherein said identifying step is performed using a predetermined existing lexical database for a set of vocabularies that include the vocabularies and the other vocabularies.

20. A system for interactive data visualization, comprising:
- a hardware processor, configured to:
  - dynamically determine, responsive to a user request directed to at least one of default categories identified by analyzing a data source used with an initial user query, pre-set values for categorical portions and numerical portions of vocabularies for user selection using data analytics on the data source;
  - dynamically generate multiple sub-queries to the data source for the pre-set values and at least one of other values specified by the user for the categorical portions and numerical portions of the vocabularies; and
  - generate a data visualization of the combined result sets;
- a display device configured to display the data visualization; and
- a user interface configured to provide the user with a capability to specify the other values for the categorical portions and the numerical portions of the vocabularies.

* * * * *